(12) United States Patent
Reeves (10) Patent No.: US 11,752,932 B2
(45) Date of Patent: Sep. 12, 2023

(54) ILLUMINATED VEHICLE SIGN

(71) Applicant: Jarrad Reeves, Madeley (AU)

(72) Inventor: Jarrad Reeves, Madeley (AU)

(73) Assignee: Jarrad Reeves, Madeley (AU)

( * ) Notice: Subject to any disclaimer, the term of this patent is extended or adjusted under 35 U.S.C. 154(b) by 0 days.

(21) Appl. No.: 17/857,368

(22) Filed: Jul. 5, 2022

(65) Prior Publication Data

US 2023/0012136 A1  Jan. 12, 2023

(30) Foreign Application Priority Data

Jul. 9, 2021  (AU) ............................... 2021204834

(51) Int. Cl.
| | |
|---|---|
| *B60Q 1/56* | (2006.01) |
| *F21S 45/30* | (2018.01) |
| *B60R 13/10* | (2006.01) |
| *F21V 3/02* | (2006.01) |
| *F21V 7/04* | (2006.01) |
| *F21Y 115/10* | (2016.01) |

(52) U.S. Cl.
CPC .............. *B60Q 1/56* (2013.01); *B60R 13/105* (2013.01); *F21S 45/30* (2018.01); *F21V 3/02* (2013.01); *F21V 7/04* (2013.01); *F21Y 2115/10* (2016.08)

(58) Field of Classification Search
CPC .... B60Q 1/56; B60Q 2800/20; B60R 13/105; F21S 45/30; F21V 3/02; F21V 7/04; F21Y 2115/10
See application file for complete search history.

(56) References Cited

U.S. PATENT DOCUMENTS

| | | | |
|---|---|---|---|
| 1,148,650 A | 8/1915 | Beauchamp | |
| 1,502,670 A | 7/1924 | Hill | |
| 10,836,306 B1* | 11/2020 | Dubey | .................. B60R 13/005 |

FOREIGN PATENT DOCUMENTS

GB          310057 A      7/1930

* cited by examiner

*Primary Examiner* — Jason M Han
(74) *Attorney, Agent, or Firm* — Carrier, Shende & Associates P.C.; Joseph P. Carrier; Fulchand P. Shende (57) ABSTRACT

An illuminated vehicle sign comprises a receptacle having an internal cavity with a light reflective internal surface. A cover over an end of the receptacle comprises one or more orifices opening into the internal cavity from an outside of the receptacle. The orifices are dimensioned and/or relatively arranged in accordance with one or more markings or alphanumeric characters. The orifices provide for ingress of air into the internal cavity from the outside of the receptacle and for emission of light from the internal cavity. A vent in the receptacle is positioned relative to the orifices to provide for egress of the air from the internal cavity. A light source is disposed within the receptacle to emit the light through the internal cavity and out of the orifices. An apertured screen is disposed inside of the internal cavity that is spaced apart from the cover.

18 Claims, 12 Drawing Sheets

ILLUMINATED VEHICLE SIGN

FIELD

The present invention relates to vehicle signage and lighting and, more particularly, to an illuminated vehicle sign for utility and work vehicles such as dump trucks.

BACKGROUND

Work vehicles are commonly used in mining and construction environments. For example, a dump truck is used to carry and transport heavy loads such as sand, gravel and demolition waste. In the mining industry, dump trucks are used to transport mined materials such as iron ore, gold and coal. High-capacity dump trucks (often called haul trucks) are specifically engineered for use in high-production mining and heavy-duty construction. These types of dump trucks typically have light panels attached to their rearmost ends. Each panel comprises a set of lights. For example, the panel may comprise indicator lights, brake lights and tail lights. The lights are typically arranged close to one another in a cluster so that the driver of a vehicle that is following the dump truck on a mine or construction site can clearly see and interpret the lights when in close proximity to the truck.

Each individual light in a vehicle light panel comprises a circular glass or plastic lens covering a reflector that contains a bulb or light emitting diode. During use, dust, dirt and other particulate materials kicked up by the traveling vehicle can easily collect and build up on the lenses of the lights which presents a hazard. For example, the driver of a vehicle that is following a dump truck may be unable to see the dump truck's brake lights when they switch on, or may misinterpret the vehicle's indicator lights, due to accumulated material on the lenses. This can lead to accidents occurring and, consequently, workplace injury and equipment damage.

A sign may also be attached to the light panel of a vehicle that displays the vehicle's identification number. On high-capacity dump trucks, a sign is used that typically comprises a set of planar metal figurines cut into the shape of the identification number. During use, dust and dirt can easily collect and build up on the sign such that the driver of a vehicle following the dump truck may be unable to see and/or comprehend the sign. This can also lead to accidents occurring and, consequently, workplace injury and equipment damage.

In an effort to avoid these problems, mining and construction sites often include washing stations that are equipped with pressurised water jet and/or blowing equipment for clearing accumulated materials off from vehicle lights and signs. However, this equipment adds a significant capital cost to a mining or construction project. A work vehicle will also typically need to visit a washing station several times during a work shift which consumes valuable time and reduces productivity. Furthermore, when particulate materials settling on the lenses of a vehicle's lights contain moisture, this causes the materials to adhere to the lenses. In such cases, it may not be possible to remove the adhered materials even when using powerful jet wash machines and blowing equipment.

It is to be understood that, if any prior art is referred to herein, such reference does not constitute an admission that the prior art forms a part of the common general knowledge in the art, in Australia or any other country.

SUMMARY

According to the present invention there is provided an illuminated vehicle sign, wherein the illuminated vehicle sign comprises:

a receptacle attachable to a vehicle, wherein the receptacle comprises an internal cavity having a light reflective internal surface;

a cover over an end of the receptacle, wherein the cover has one or more orifices opening into the internal cavity from an outside of the receptacle, wherein the orifices are dimensioned and/or relatively arranged in accordance with one or more markings or alphanumeric characters corresponding to the vehicle, and wherein the orifices provide for ingress of air into the internal cavity from the outside of the receptacle, and wherein the orifices provide for emission of light from the internal cavity to the outside of the receptacle;

a vent provided in the receptacle, wherein the vent is positioned relative to the orifices to provide for egress of the air from the internal cavity;

a light source disposed within the receptacle to emit the light through the internal cavity and out of the orifices; and an apertured screen disposed inside of the internal cavity, wherein the apertured screen is spaced apart from the cover.

The light source may be positioned relative to the apertures such that the light source is hidden from sight when the internal cavity is viewed through the apertures from the outside of the housing.

The present invention also provides a vehicle light, wherein the vehicle light comprises:

a housing attachable to a vehicle, wherein the housing comprises an internal cavity, the internal cavity comprising a light reflective internal surface, and an aperture opening into the internal cavity from an outside of the housing, wherein the aperture provides for ingress of air into the internal cavity and for emission of light from the internal cavity;

a vent formed in the housing, wherein the vent is positioned relative to the aperture to provide for egress of the air from the housing; and a light source disposed within the housing to emit the light through the internal cavity and out of the aperture, wherein the light source is positioned relative to the aperture such that the light source is hidden from sight when the internal cavity is viewed through the aperture from the outside of the housing.

The housing may be dimensioned such that the light source is hidden from sight by a section of the housing when the internal cavity is viewed through the aperture from the outside of the housing.

The housing may comprise at least first and second elongate portions connected together such that respective longitudinal axes of the elongate portions are not coaxial. The aperture may be provided in the first of the elongate portions and the light source may be positioned in the second of the elongate portions. The light source may be hidden from sight by the second of the elongate portions when the internal cavity is viewed through the aperture from the outside of the housing.

The second of the elongate portions may comprise an internal section that protrudes into an internal cavity of the first of the elongate portions, and the internal section may comprise an endmost aperture for emitting the light from the light source into the internal cavity of the first of the elongate portions.

The internal section may be dimensioned to allow the air to flow around the internal section when the air is flowing from the aperture towards the vent.

An annular skirt may extend around a circumference of the internal section, wherein the annular skirt is adapted to deflect the air towards the vent.

The annular skirt may comprise a concave lowermost deflection surface.

The internal section may be tubular.

The housing may comprise a ledge outwardly extending from a lowermost edge of the aperture.

The housing may comprise a tubular portion having an outlet end comprising the aperture, and the ledge may outwardly extend from a lowermost edge of the outlet end.

The outlet end may be downwardly bevelled.

The housing may comprise a fluid inlet comprising a hose coupling means.

The present invention also provides a vehicle light and sign assembly, wherein the assembly comprises the vehicle light described above and a sign disposed relative to the vehicle light, wherein the sign comprises:

a receptacle comprising an internal chamber;

at least one light source for emitting light into the internal chamber; and a cover over an end of the receptacle, wherein the cover has one or more orifices formed therein for emitting light out of the receptacle, the orifices being dimensioned and/or relatively arranged in accordance with one or more markings or alphanumeric characters corresponding to the vehicle.

The assembly may comprise a second vent, wherein the second vent is arranged to divert air flowing into the receptacle via the orifices into the housing of the vehicle light.

The second vent may be elongated and may extend diagonally downward from the receptacle into the housing of the vehicle light.

The receptacle may comprise a deflection member configured to deflect the air flowing into the receptacle via the orifices into the second vent.

The assembly may comprise a conduit arranged to deflect light from the housing of the vehicle light into the internal chamber of the receptacle.

The receptacle may comprise an apertured screen disposed inside the internal chamber, wherein the apertured screen is spaced apart from the cover.

The light source disposed relative to the internal chamber may be located inside of the internal chamber.

The light source disposed relative to the internal chamber may be located outside of the internal chamber, and may be arranged to emit light into the internal chamber via one or more conduits connected to the receptacle.

BRIEF DESCRIPTION OF DRAWINGS

Embodiments of the invention will now be described by way of example only with reference to the accompanying drawings, in which.

DESCRIPTION OF EMBODIMENTS

Figure 1:
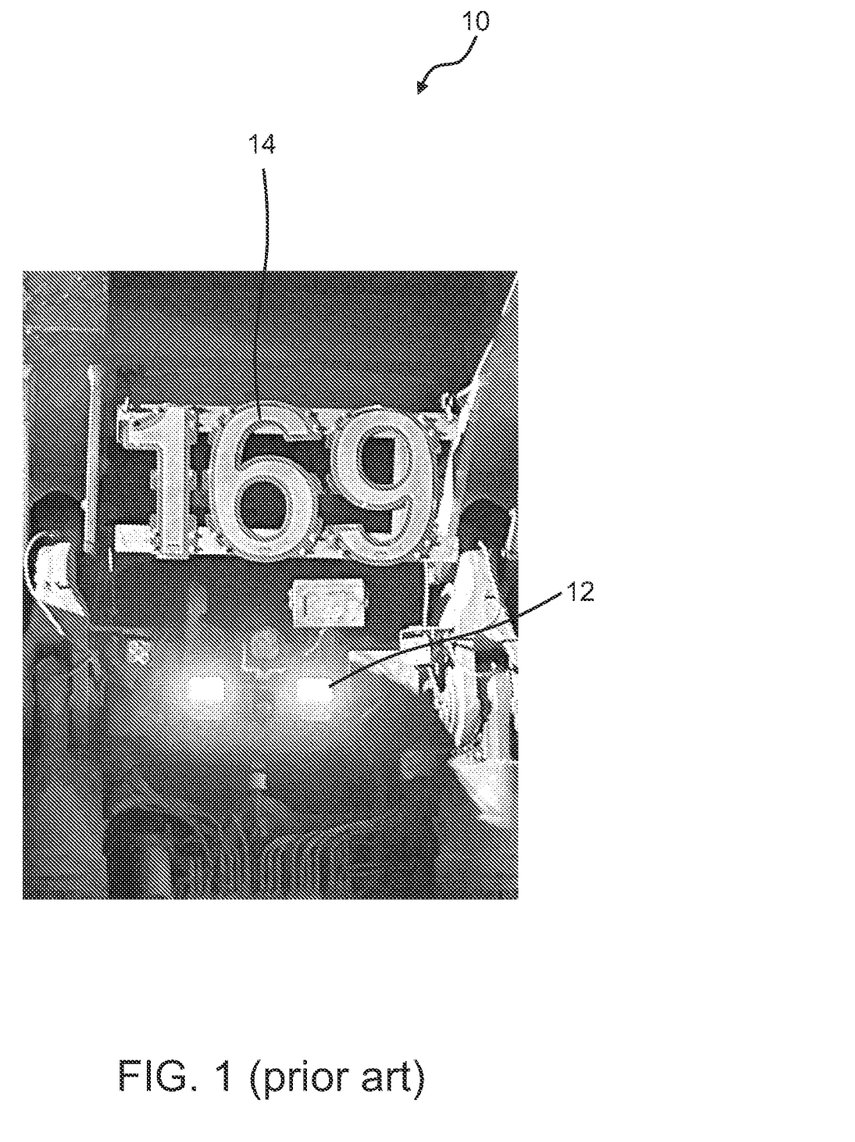
FIG. 1 is an image of a rearmost end of a high capacity dump truck as known in the art.

Referring to FIG. 1, there is shown an image of a rearmost end of a high-capacity dump truck 10 of the type that is commonly used in mining and heavy-duty construction environments. The dump truck 10 comprises a panel attached to the rearmost end that has a cluster of lights 12. Each light 12 comprises a circular glass or plastic lens that covers a concave reflector. The reflector contains a bright light emitting diode (LED) that emits light through the lens and away from the panel.

A sign 14 is attached above the light panel that displays the vehicle's identification number, which in the example provided is "169". The sign 14 comprises a set of planar metal figurines cut into the shape of the identification number. During use, dust and dirt can easily collect and build up on the sign 14 and on the lenses of the lights 12. When this happens, the driver of a vehicle that is following the dump truck 10 may be unable to see and/or comprehend the sign 14 and lights 12. This can lead to accidents occurring and, consequently, workplace injury and equipment damage.

Figure 2:
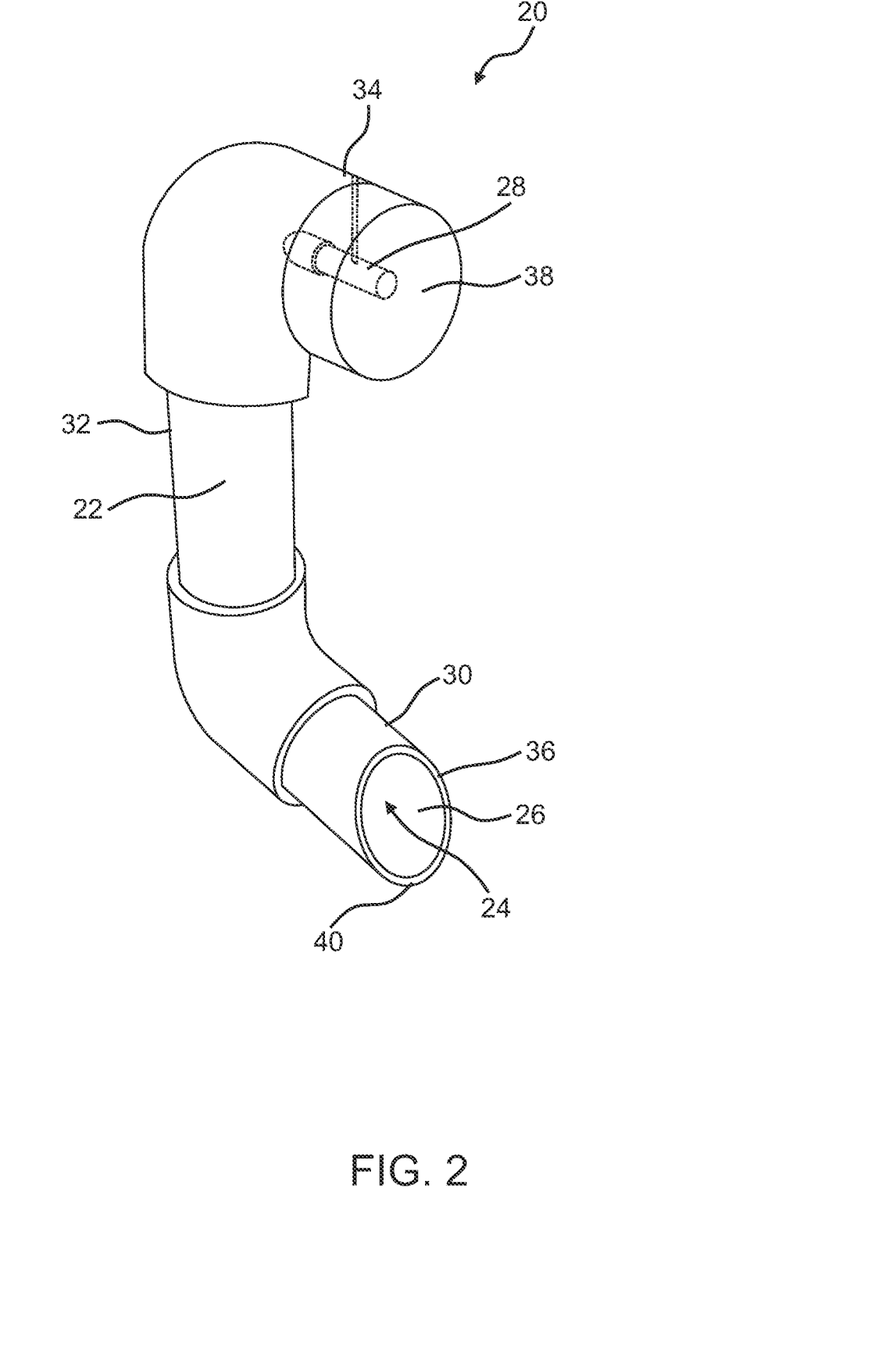
FIG. 2 is a perspective view of a vehicle light according to an example embodiment of the invention.
Figure 3:
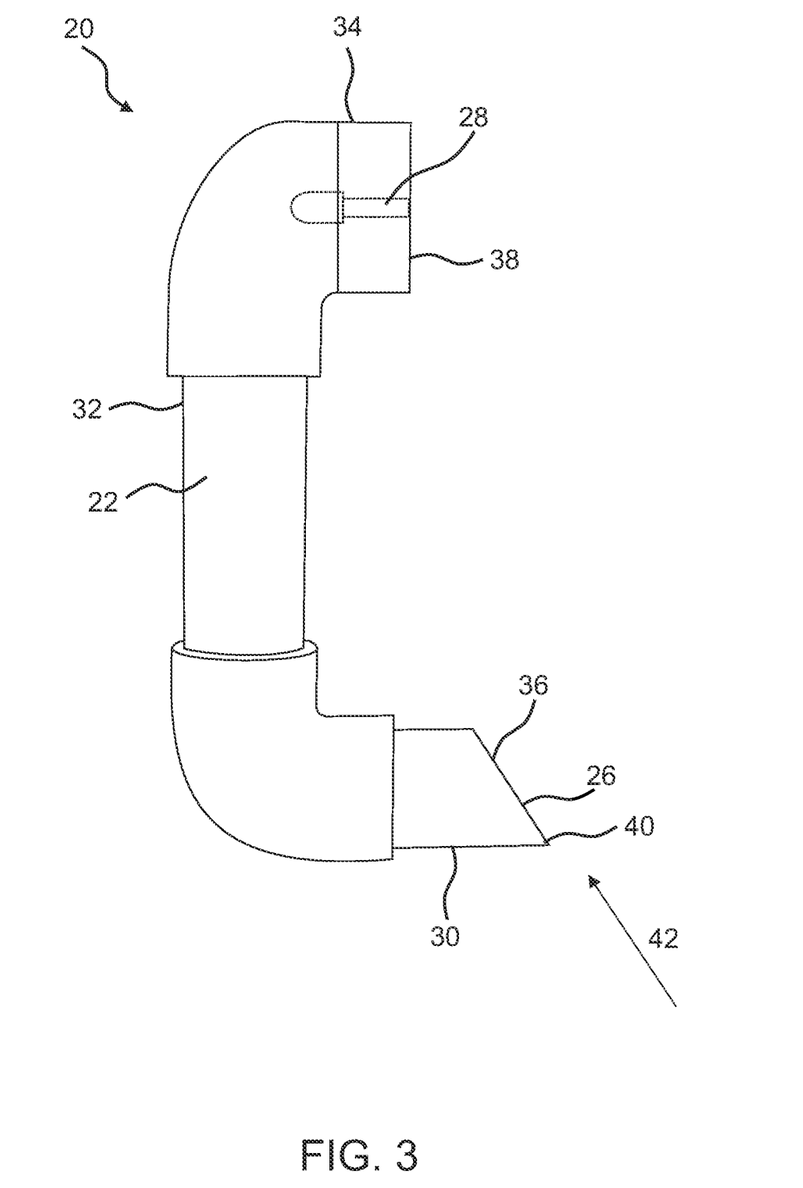
FIG. 3 is a side elevation view of the vehicle light.

Referring to FIGS. 2 and 3, an example embodiment of the present invention provides a vehicle light 20. The vehicle light 20 comprises a housing 22 that is attachable to a vehicle, wherein the housing 22 comprises an internal cavity 24 having a light reflective internal surface. The housing 22 also comprises an aperture 26 opening into the internal cavity 24 from an outside of the housing 22, wherein the aperture 26 provides for the ingress of air into the internal cavity 24 and for the emission of light from the internal cavity 24. The vehicle light 20 also comprises a light source 28. The light source 28 is disposed within the housing 22 to emit the light through the internal cavity 24 and out from the housing 22 via the aperture 26. The light source 28 is positioned relative to the aperture 26 such that the light source 28 is hidden from sight when the internal cavity 24 is viewed through the aperture 26 from a position 39 (see FIG. 4) outside of the housing 22.

More particularly, in the example depicted the housing 22 comprises a curved tube comprising first 30, second 32 and third 34 elongate tube portions that are joined together. The first elongate tube portion 30 may be disposed at a lowermost end of the curved tube 22 and the third tube portion 34 may be disposed at an uppermost end of the curved tube 22.

The second tube portion 32 may be arranged intermediate, and extend between, the first and second tube portions 30, 34. In this arrangement, the respective longitudinal axes of the first and second tube portions 30, 32 are not coaxial and are aligned at an angle of ninety degrees relative to one another to form an L-shaped configuration. Similarly, the respective longitudinal axes of the second and third tube portions 32, 34 are not coaxial and are aligned at an angle of ninety degrees relative to one another to form an inverted L-shaped configuration. The complete curved tube 22, and its internal elongate cavity 24, may, therefore, each be substantially U-shaped and have a longitudinal axis that bends through a total angle of 180 degrees end to end.

The second (intermediate) tube portion 32 may be provided with a suitable attachment means, such as a clip or clamp assembly (not shown), that enables the second tube portion 32 to be attached onto a side of a vehicle, such as to the rear end of a dump truck. The second tube portion 32 may be attachable to the vehicle such that the tube's longitudinal axis is oriented vertically once attached to the vehicle. In this configuration, the first and third tube portions 30, 34 each extend away from the vehicle in a generally horizontal direction.

In the example depicted, the aperture 26 of the curved tube 22 is provided at a lowermost outlet end 36 of the first tube portion 30. At an opposed uppermost end of the curved tube 22, the terminal end 38 of the third tube portion 34 may be sealed to encase the light source 28 therein. The light source 28 may be positioned inside of the third tube portion 34 such that it emits light from the third tube portion 34 into and along an internal cylindrical lumen extending through the second and first tube portions 32, 30 in the direction of the aperture 26. The light source 28 may comprise an LED, an incandescent or halogen bulb, a fluorescent lamp or other suitable light emitting device. The light source 28 may be contained inside a water resistant casing within the tube 22 to protect it from exposure to any moisture entering into the tube 22 during use. The internal surface of the cylindrical lumen of the housing 22 may be light reflective, or it may be lined by a suitable light reflective material, and may comprise a mirrored surface, glass or shiny polished metal. In other examples, the internal surface may be a matte colour but nevertheless be sufficiently light reflective to allow light to propagate from the light source 28 towards the aperture 26. As used herein, the term "light reflective" is intended to describe any material or surface that is capable of reflecting light by a sufficient amount to allow the light to propagate through an internal cavity or region for the purposes of performing the present invention.

The light source 28 may be located in different positions relative to the curved tube 22 to those depicted. For example, the light source 28 may be located inside of the second tube portion 32. In such examples, the terminal upper end 38 of the curved tube 22 may be open and comprise an aperture, similar to the aperture 26 of the first tube portion 30, to allow a jet of water or air to be forced into and through the internal cavity 24 from either end of the tube 22 to flush the internal cavity 24 during cleaning of the light 20. In another example, the light source 28 may be disposed inside a housing that attaches onto the terminal end 38 of the third tube portion 34. As best shown in FIG. 3, the outlet end 36 may be downwardly bevelled to form a ledge 40 that outwardly extends from a lowermost edge of the outlet end 36.

In use, the vehicle light 22 may be attached to a work vehicle such as a dump truck of the type that is commonly used in mining and heavy-duty construction environments. For example, the second tube portion 32 of the light 22 may be attached to a rearmost end of the vehicle such that its longitudinal axis is oriented vertically against the vehicle, with the first and third tube portions 30, 34 extending horizontally away from the vehicle. The light source 28 emits light along and through the elongate internal cavity 24 of the curved tube 22. The light is reflected by the internal wall of the cavity 24 and propagates downwardly toward the first tube portion 30. The light is emitted from the vehicle light 20 via the aperture 26 provided at the open outlet end 36 of the tube 22.

The light source 28 is positioned such that it is hidden from sight when the internal cavity 24 is viewed through the aperture 26 from the outside of the tube 22. For example, the light source 28 is concealed from view when the internal cavity 24 is viewed from the position outside of the tube 22 labelled 39 in FIG. 4. This arrangement advantageously ensures that any dust, debris or similar particulate materials that may enter the tube 22 via the aperture 26 during use do not come into direct contact with the light source 28. For example, dirt kicked up towards the vehicle light 20 by the wheels of the vehicle will be caused to settle on the inside surface of the first tube portion 30, rather than propagating along the internal cavity 24 towards the light source 28. Finer particulate materials, such as airborne dust and sand, are blown towards the rear end of the first tube portion 30 and settle on the rearmost vertical internal wall of the second tube portion 32. The light source 28 is effectively disposed away from a direct line of sight extending through the aperture 26 and is, therefore, shielded by the walls of the curved tube 22 from such materials.

As indicated by the arrow labeled 42 in FIG. 3, airborne particulate materials are commonly blown towards the rear end of a dump truck in a diagonally upward direction during use. The bevelled outlet end 36 of the first tube portion 30 advantageously forms a ledge 40 that provides a barrier to block the egress of such airborne materials into the aperture 26.

In the event that any particulate materials accumulate in the internal cavity 24 of the tube 22 over prolonged use of the vehicle light 20, the tube 22 may be advantageously cleared in a fast and time efficient manner by forcing a jet of water or air through the elongate cavity 24 via the aperture 26. In other examples, the tube 22 may comprise a dedicated fluid inlet comprising a hose coupling means (not shown) for connecting a high pressure water hose to a different entry point on the tube 22 for such flushing purposes.

Figure 4:
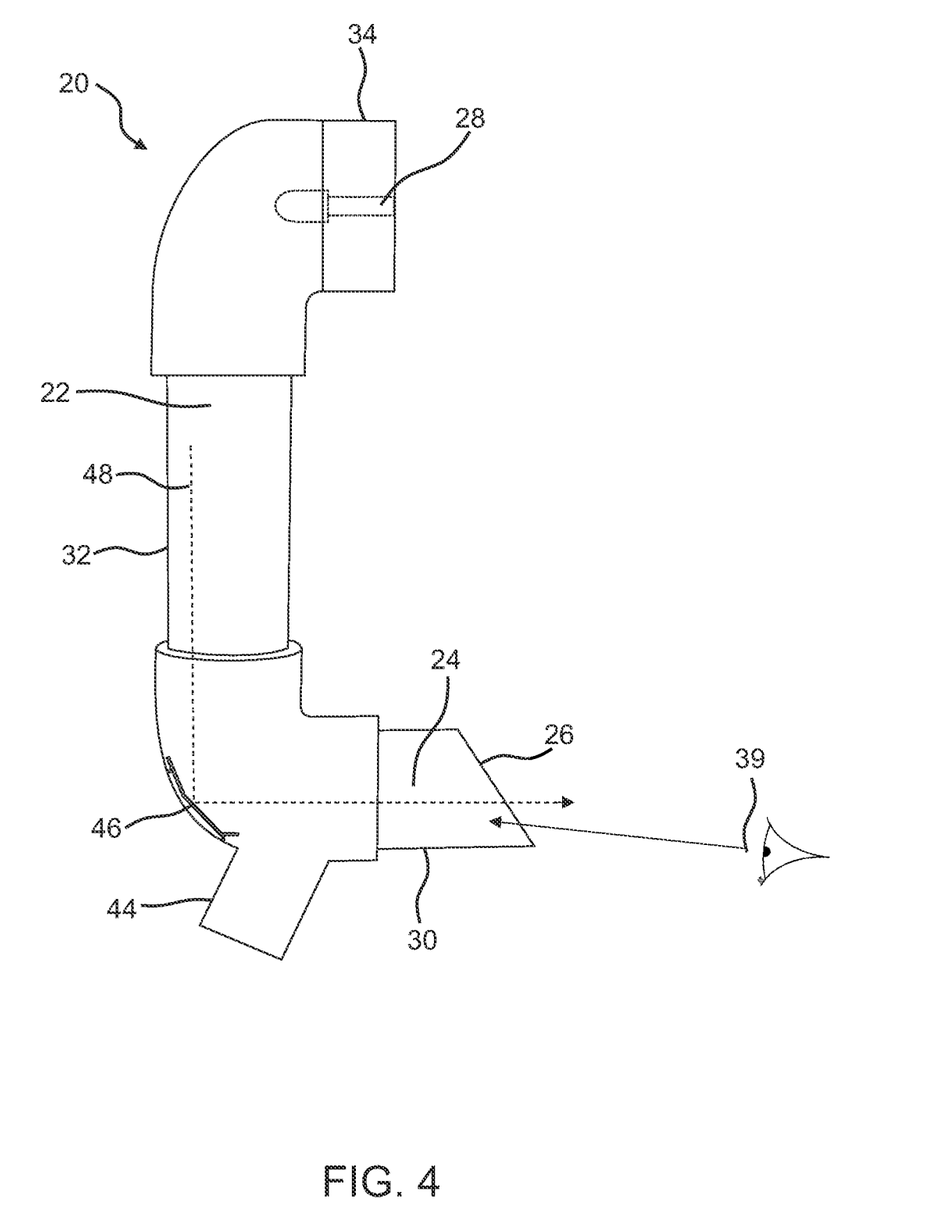
FIG. 4 is a side elevation view of a vehicle light according to a further example embodiment of the invention.

Referring to FIG. 4, in one further example the curved tube 22 of the vehicle light 20 may comprise a vent 44 downwardly and rearwardly extending from a junction between the first tube portion 30 and the second tube portion 32. The vent 44 may be advantageously configured such that any particulate materials blown into the first tube portion 30 during use via the aperture 26 are caused to exit the tube 22 via the vent 44. To avoid the vent 44 materially affecting the effective propagation of light along the tube 22, a reflector 46 may be arranged proximal to the junction between the first and second tube portions 30, 32. As indicated by the arrow labeled 48, the reflector 46 may be positioned and orientated such that it reflects rays of light from the second tube 32 portion into the first tube portion 30 and over the orifice in the internal cavity 24 that provides the entryway into the vent 44.

Figure 5:
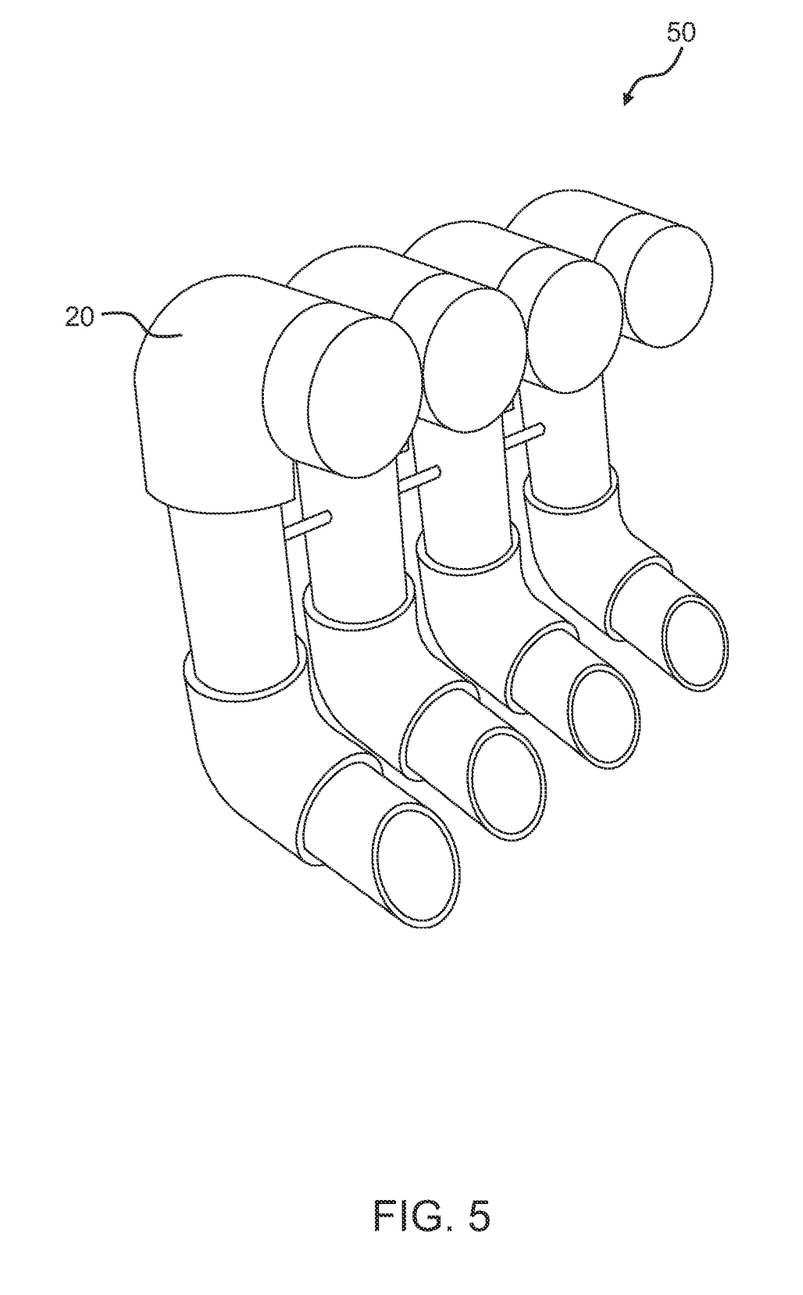
FIG. 5 is a perspective view of a vehicle light assembly according to a further example embodiment of the invention.

The vehicle light 20 may be used standalone to provide a single point of light for a vehicle. For example, the vehicle light 20 may be used to provide an individual indicator light or a single taillight of a vehicle. The vehicle light 20 may also be used in combination with other lights. For example, referring to FIG. 5 there is depicted a vehicle light assembly 50 that comprises a set of four of the lights 20 joined together in a row. The outermost pair of the four lights 20 may comprise indicator lights and the innermost pair of the four lights may comprise brake lights.

Figure 6:
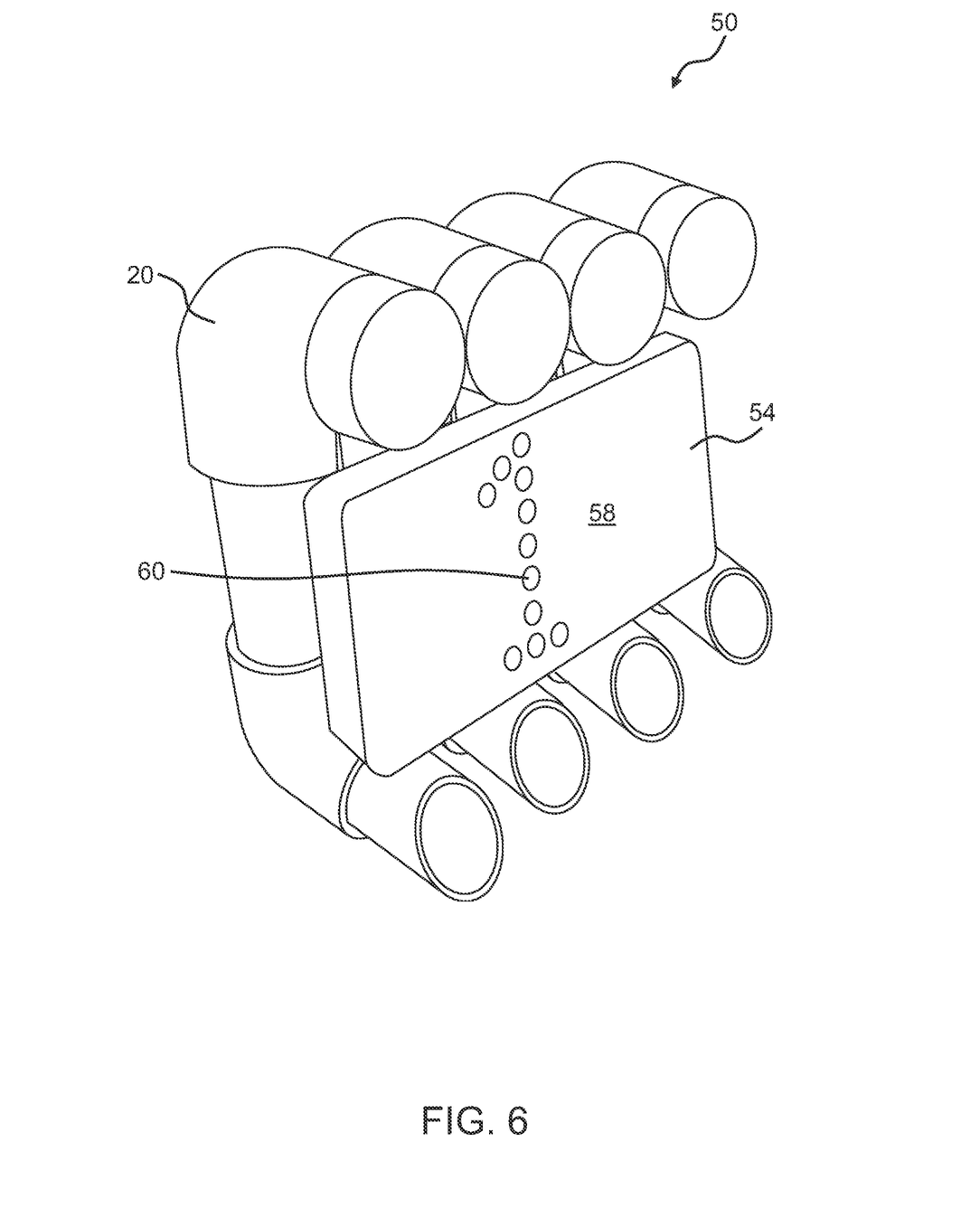
FIG. 6 is a perspective view of the vehicle light assembly of FIG. 5 provided with an illuminated sign attached thereto.
Figure 7:
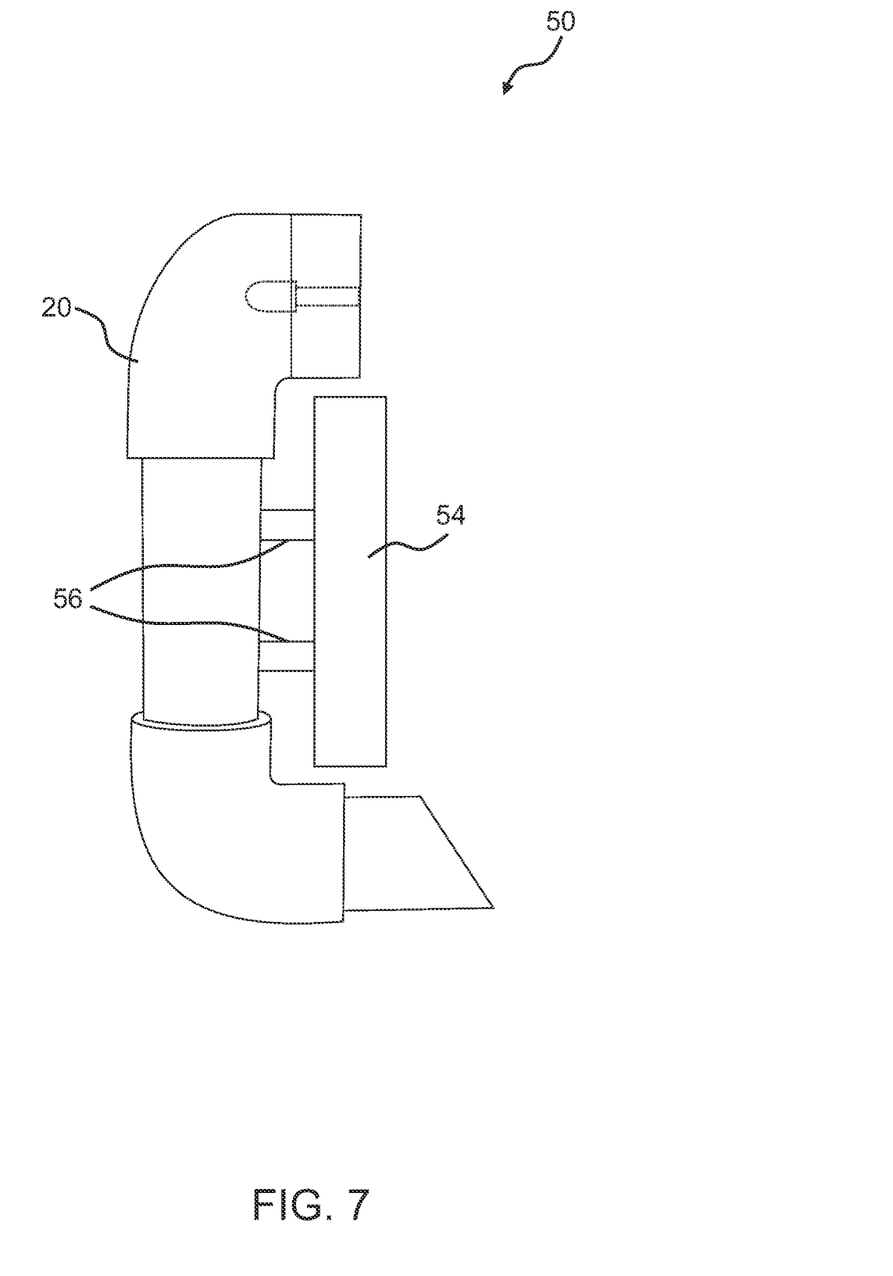
FIG. 7 is a side elevation view of the vehicle light assembly of FIG. 6.

The light that is propagating through the tubular housings of the four lights 20 may also be used to illuminate additional features connected to the light assembly 50, such as vehicle signage. For example, as shown in FIG. 6 a receptacle 54 may be attached to the light assembly 50. The receptacle 54 may be substantially rectangular and have an internal chamber formed therein. As shown in FIG. 7, a pair of conduits 56 may extend between the lights 20 and the receptacle 54. The conduits 56 are adapted to transfer light propagating through the lights 20 into the internal chamber of the receptacle 54. The receptacle 54 may comprise a cover 58 that has one or more orifices 60 formed therein for emitting light out from receptacle 54. The orifices 60 may be dimensioned and/or relatively arranged in accordance with one or more markings or alphanumeric characters corresponding to a vehicle. The receptacle 54, therefore, provides an illuminated sign for the vehicle.

Figure 8:
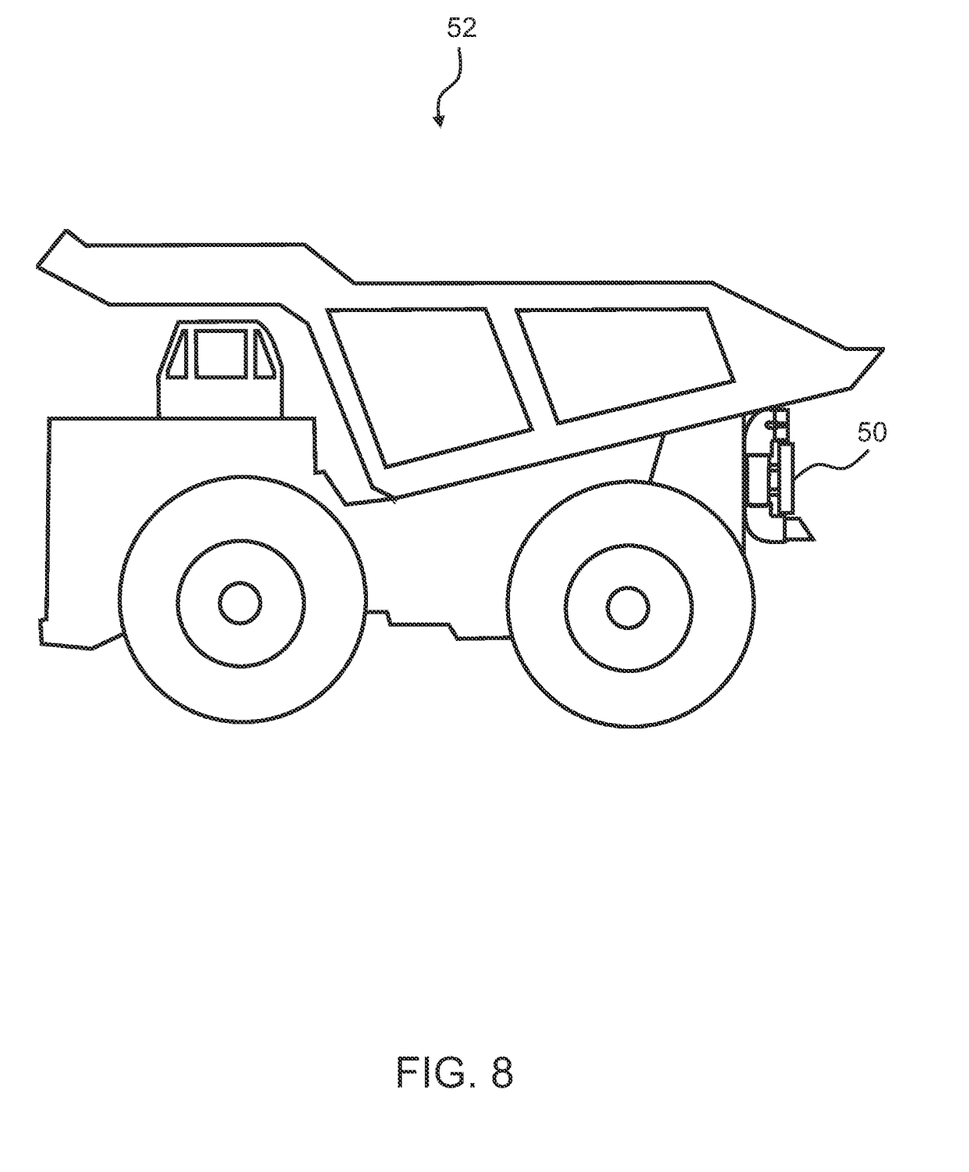
FIG. 8 is a side elevation view of a high-capacity dump truck with the vehicle light assembly of FIG. 6 attached thereto.

The light sources 28 that provide the light emanating out from the orifices 60 are provided within the tubular housings of the lights 20. The light sources 28 are, therefore, hidden from sight when the internal chamber of the receptacle 54 is viewed through the orifices 60 from outside of the receptacle 54. The light sources 28 are advantageously shielded from any dirt, dust and other particulate materials that may enter into the receptacle 54 via the orifices 60 during use. In other examples, instead of the conduits 56 the receptacle 54 may comprise one or more separate tubes or hollow housings (not shown) connected to the receptacle 54 in which a light source is contained to supply the light into the internal chamber of the receptacle 54. As illustrated in FIG. 8, the light assembly 50 may be attached to the rear end of a high-capacity dump truck 52 to provide a set of lights 20 and an illuminated sign 54 for the truck 52. The lights 20 and sign 54 remain highly visible and legible when exposed to particulate materials during use.

Figure 9:
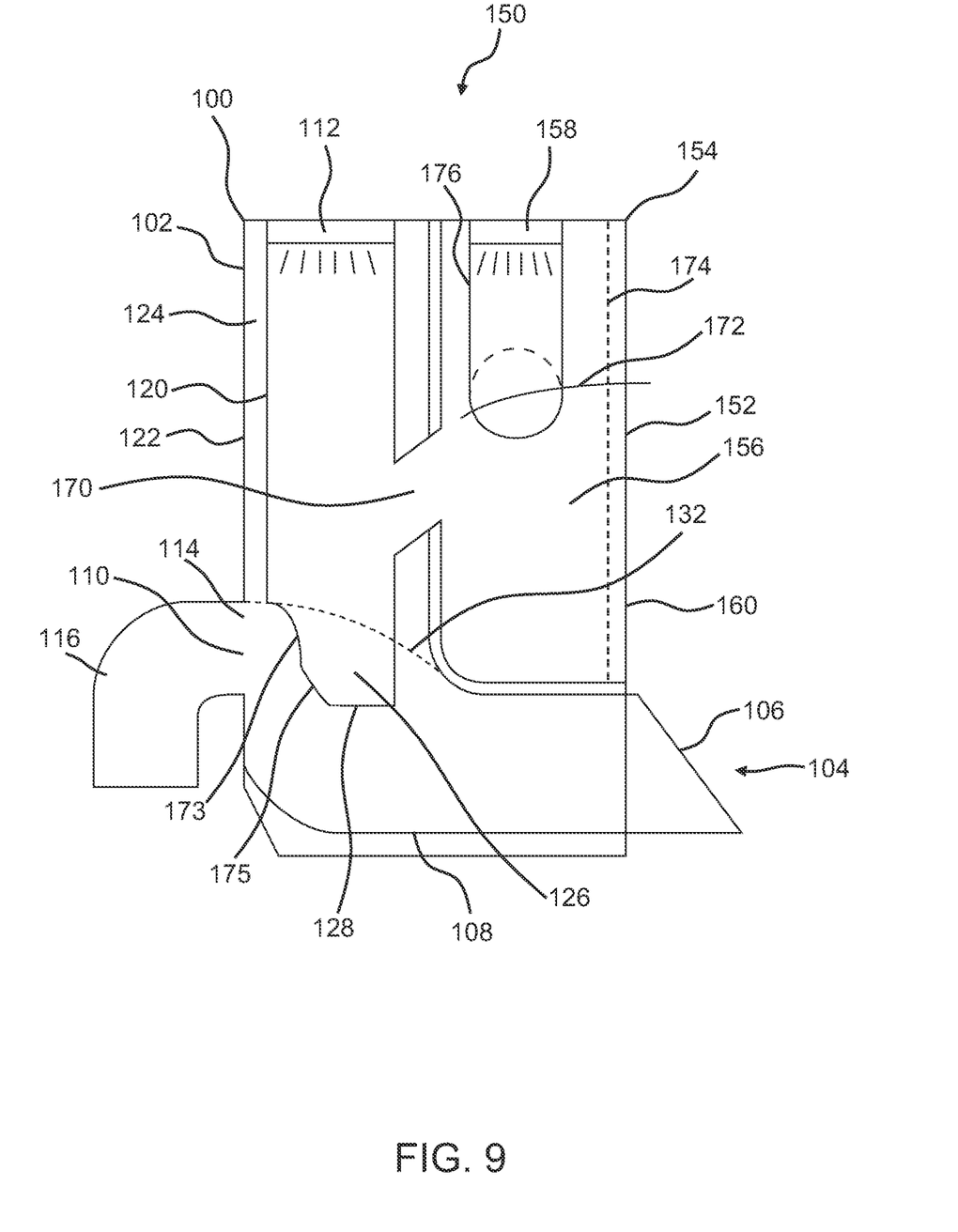
FIG. 9 is a side elevation view of a vehicle light and sign assembly according to a further example embodiment of the invention.
Figures 10A, 10B:
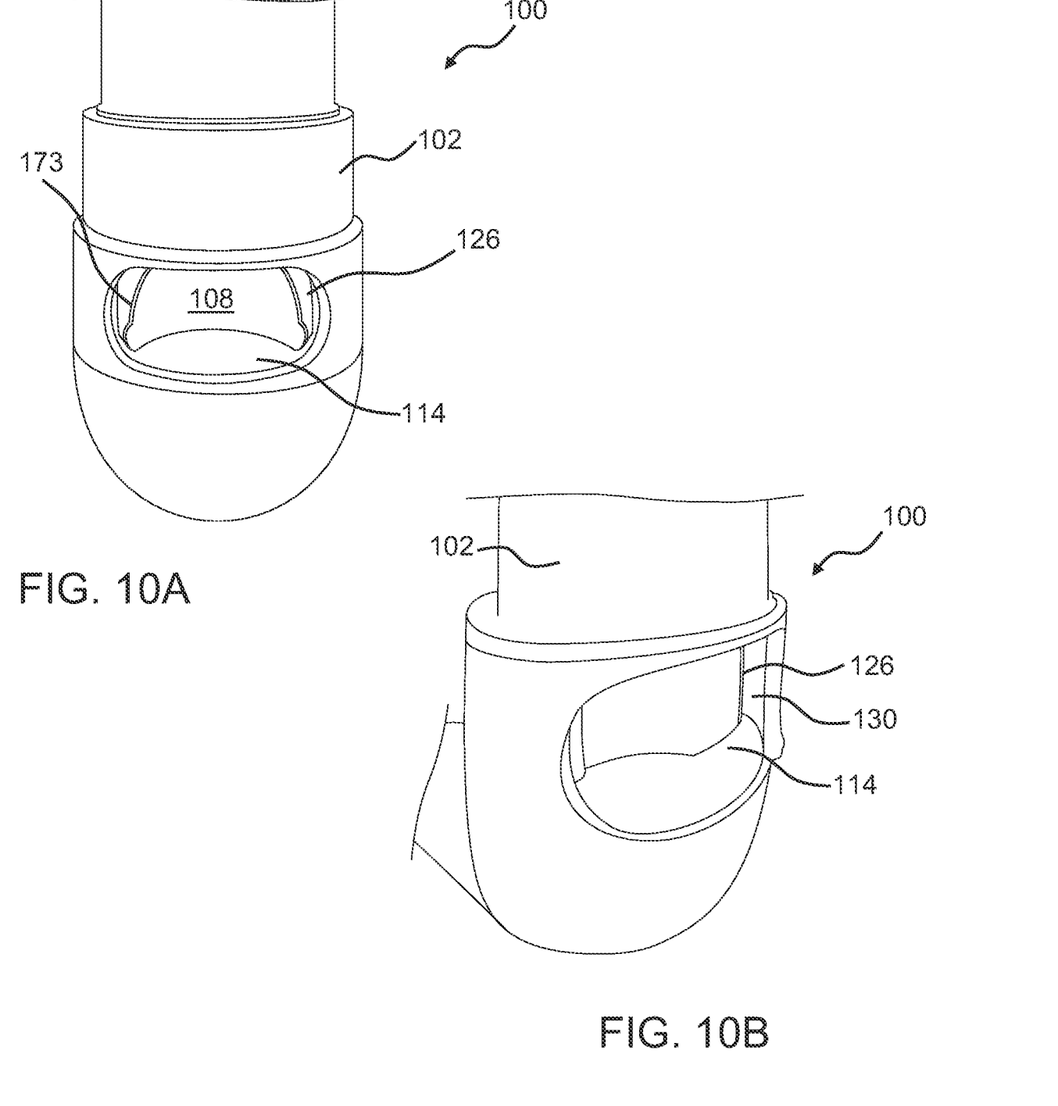
FIG. 10A is a partial perspective view of a lower rearmost portion of a vehicle light of the assembly shown in FIG. 9, wherein a vent of the vehicle light is shown with an outlet pipe of the vent removed.
FIG. 10B is a further partial perspective of the lower rearmost portion of the vehicle light shown in FIG. 10A.

Referring now to FIGS. 9, 10A and 10B, there is depicted a vehicle light 100 according to a further embodiment of the invention. The vehicle light 100 comprises a housing 102 that is attachable to a vehicle, wherein the housing 102 comprises an internal cavity 104 and an aperture 106 opening into the internal cavity 104 from an outside of the housing 102. The internal cavity 104 comprises a light reflective internal surface 108 and the aperture 106 provides for the ingress of air into the internal cavity 104 and for the emission of light from the internal cavity 104. A vent 110 is formed in the housing 102, wherein the vent 110 is positioned relative to the aperture 106 to provide for the egress of the air from the housing 102. At least one light source 112 is disposed within the housing 102 to emit the light through the internal cavity 104 and out of the aperture 106. The light source 112 is positioned relative to the aperture 106 such that the light source 112 is hidden from sight when the internal cavity 104 is viewed through the aperture 106 from the outside of the housing.

The housing 102 may comprise a vertically oriented tubular portion and a horizontally oriented tubular portion, wherein the two portions are joined together in an L-shaped configuration such that they are not coaxial. The two portions may be releasably joined together such that they are replaceable in the event that one of them gets damaged or suffers wear and tear. The light source 112 may be positioned toward an uppermost end of the vertically oriented tubular portion and the aperture 106 may be positioned at an outermost end of the horizontally oriented tubular portion. In this configuration, light that is emitted from the light source 112 propagates through the two internal cavities of the two tube portions towards the aperture 106. Furthermore, the L-shaped arrangement of the two tubular portions provides that the light source 112 is hidden from sight by the vertically oriented tubular portion when the internal cavity 104 is viewed from the outside of the housing 102 via the aperture 106 of the horizontally oriented tubular position.

The vent 110 may be provided toward an innermost end of the horizontally oriented tubular portion. The vent 110 may comprise an aperture 114 that is formed in the innermost end, and an outlet pipe 116 may interface with the aperture 114. In FIGS. 10A and 10B, the vent 110 is shown with the outlet pipe 116 removed from the aperture 114. The two apertures 106, 114, that allow for the ingress and egress of air respectively, are preferably relatively positioned such that there is a direct line of sight between them when the internal cavity 104 is viewed from either aperture 106, 114.

The vertically oriented tubular portion may comprise an internal tube section 120 that is arranged inside an external tube section 122. A channel 124, that is annular in cross section, may extend downwardly between the internal and external tube sections 120, 122. The lowermost end 126 of the internal tube section 120 may extend downwardly into the internal cavity of the horizontally oriented tubular portion and may comprise an endmost aperture 128 for emitting the light from the light source 112 into the internal cavity of the horizontally oriented tubular portion. The lowermost end 126 may also be configured to prevent the air that flows into the cavity 104 via the aperture 106 from flowing into the endmost aperture 128. For example, the light source 112 may be positioned inside the internal tube section 120 and the uppermost end of the internal tube section 120 may be sealed. In this arrangement, a cylindrical column of air forms a pocket inside of the internal tube section 120. The air pocket helps to prevent air from flowing up into the endmost aperture 128.

Preferably, the lowermost end 126 is dimensioned such that the air that flows through the horizontally oriented tubular portion flows around the lowermost end 126. For example, the lowermost end 126 may be generally circular in cross section and dimensioned such that an annular-shaped channel 130 is formed around the lowermost end 126, as shown in FIG. 10B. The channel 130 allows the air to flow smoothly around the lowermost end 126 and into the outlet aperture 114 of the vent 110. The lowermost end 126 may also comprise an annular skirt 132 extending around its circumference.

The skirt 132 may form a seal between the internal and external tube sections 120, 122 and be adapted to deflect the air towards the vent 110 when flowing through the horizontally oriented tubular portion. The skirt 132 may be curved and comprise a concave lowermost surface to improve air deflection and flow. The vent 110 and skirt 132 arrangement advantageously causes any airborne dirt, dust and debris that finds its way into the cavity 104 via aperture 106 to exit the housing 102 in an effective manner.

Figure 11:
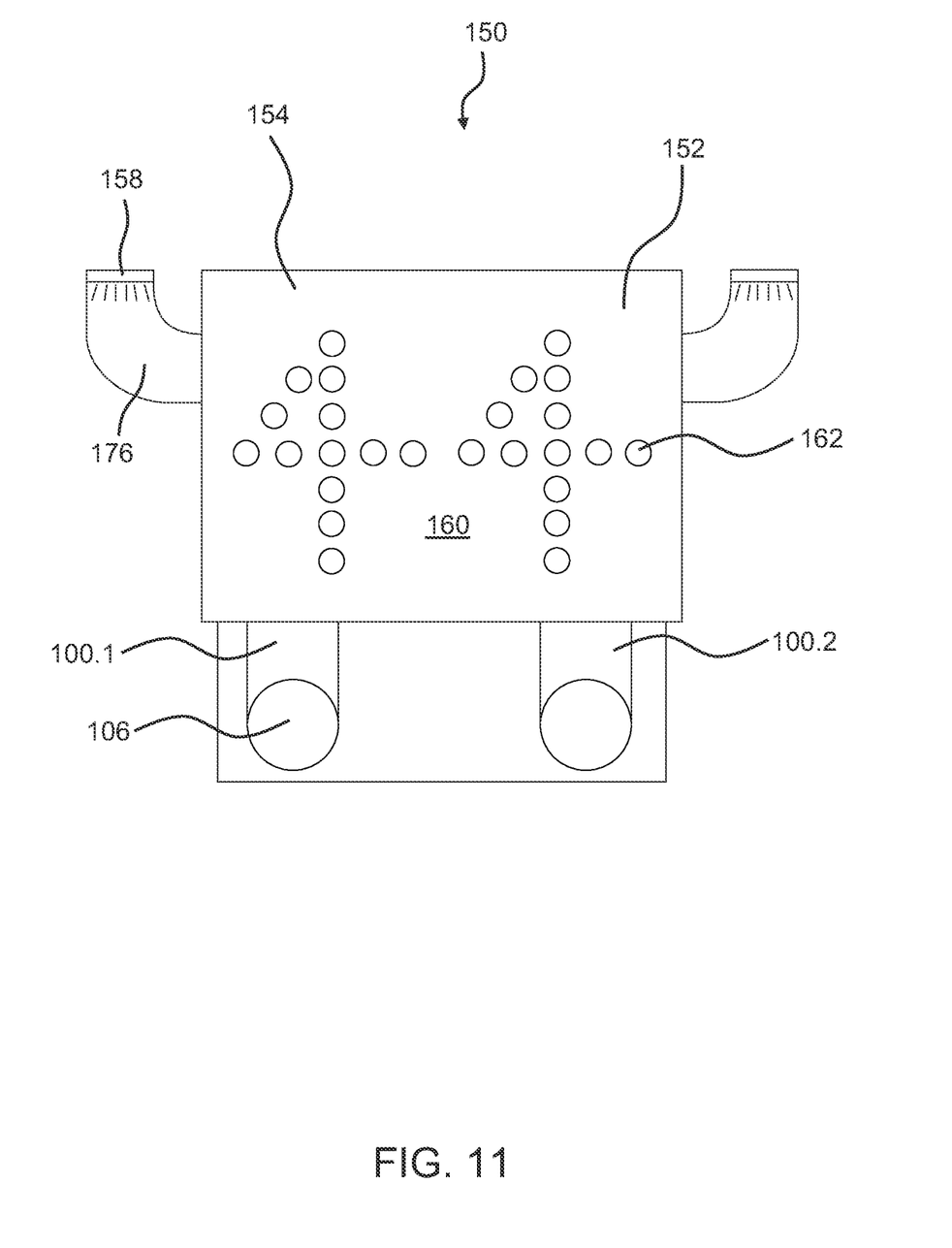
FIG. 11 is a rear elevation view of the vehicle light and sign assembly of FIG. 9.

In embodiments, the vehicle light 100 that is depicted in FIGS. 9 and 10A-B may form part of a vehicle light and sign assembly 150. Referring to FIG. 11, the assembly 150 may comprise a plurality of the vehicle lights 100 and a sign 152 that is disposed relative to the lights 100. Two of the vehicle lights 100 are depicted in the example. The sign 152 may comprise a receptacle 154 comprising an internal chamber 156 and at least one light source 158 disposed relative to the internal chamber 156 for emitting light into the internal chamber 156. The receptacle 154 also comprises a cover 160 over an end of the receptacle 154, wherein the cover 160 has one or more orifices 162 formed therein for emitting light out from the receptacle 154. The orifices 162 are dimensioned and relatively arranged in accordance with one or more alphanumeric characters or markings corresponding to a vehicle that the assembly 150 is attached to. In the example shown in FIG. 11, each of the orifices 162 is circular in shape and the orifices 162 are arranged together such that they display the number forty four.

The assembly 150 may comprise at least one second vent 170 (see FIG. 9) that is arranged to divert any air that flows into the receptacle 154 via the orifices 162 during use into the housing 102 of one the vehicle lights 100. The second vent 170 may be elongated and extend diagonally downward from the receptacle 154 into the relevant housing 102. The receptacle 154 may also comprise a deflection member 172 that is configured to deflect the air flowing into the receptacle 154 into the second vent 170. The deflection member 172 may comprise a concave undersurface and may have a frontmost peripheral portion that extends through the cover 160 and outwardly protrudes away from the cover 160, as shown in FIG. 9. The frontmost portion serves to block any air moving in an upward direction across the face of the cover 160 during use and directs the moving air into the orifices 162.

A hole 173 may be formed in a lower rearmost side of lowermost end 126 that allows air arriving into the housing 102 from the second vent 170 to flow into vent 110. The lower rearmost corner 175 of the lowermost end 126 below the hole 173 may be diagonally tapered, which reduces turbulence in air flowing around the lowermost end 126 from the aperture 106 toward the vent 110.

The receptacle 154 may also comprise an apertured screen 174 that is disposed in the internal chamber 156, wherein the apertured screen 174 is spaced apart from the cover 160. The apertured screen 174 may comprise a plurality of small holes that allow light emitted by the light source 158 to propagate through the screen 174 and toward the cover 160. The skilled person will appreciate that any rays of light incident on the cover 160 that do not pass through the orifices 162 will be reflected back toward the screen 174. The surface of the screen 174 that faces the cover 160 serves to reflect these rays of light back toward the cover 160. The screen 174, therefore, improves the brightness and intensity of the resultant light emitted through the orifices 162.

The light source 158 may be located outside of the internal chamber 156 and be arranged to emit light into the internal chamber 156 via a conduit 176 that is connected to the receptacle 154. In the example shown in FIG. 11, the assembly 150 comprises a pair of the light sources 158 that are disposed on respective opposed sides of the assembly 150. In other examples, the light emitted into the receptacle 154 may be provided solely by the light sources 112 of the vehicle lights 100 included in the assembly 150, and the assembly 150 may comprise one or more conduits extending between the lights 100 and the receptacle 154 to supply the light in such examples.

Figure 12:
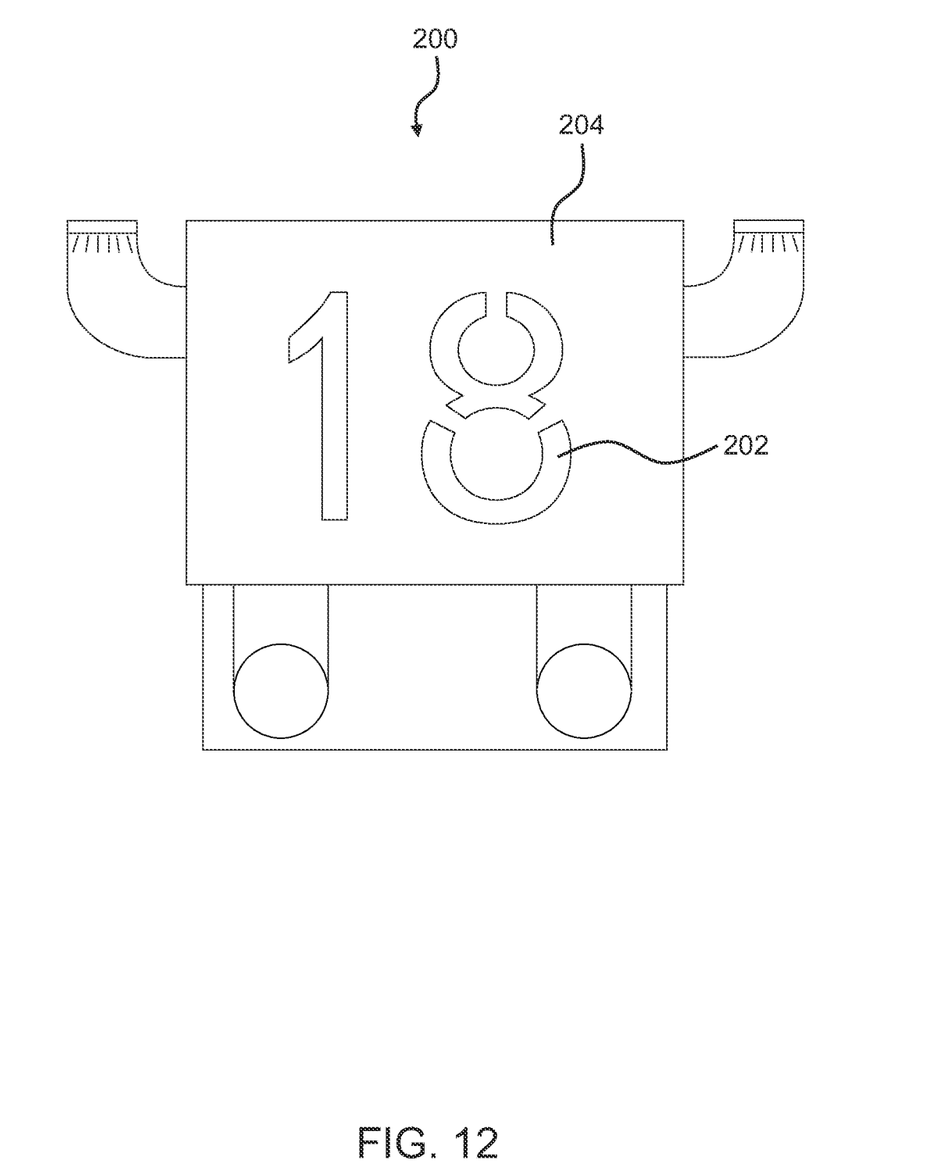
FIG. 12 is a rear elevation view of a vehicle light and sign assembly according to a further example embodiment of the invention.

A further vehicle light and sign assembly 200 is depicted in FIG. 12. The assembly 200 is materially the same as the one 150 shown in FIG. 11 except that the orifices 202 of the sign 204 comprise elongate sections, rather than circular holes, and are arranged to display the number eighteen.

The skilled addressee will appreciate that features in FIGS. 1 to 12 are illustrated for simplicity and clarity and have not necessarily been drawn to scale. For example, the dimensions and/or relative positioning of some of the features may be exaggerated relative to other features to facilitate an understanding of the various example embodiments exemplifying the principles described herein. Also, common but well understood features that are useful or necessary in a commercially feasible embodiment are often not depicted in order to provide a less obstructed view of these various examples. It will also be understood that the terms and expressions used herein adopt the ordinary meaning as is accorded to such terms and expressions with respect to their corresponding respective areas of inquiry and study except where specific meanings have otherwise been set forth herein.

The figures are schematic only and the location and disposition of the features depicted may vary according to the particular arrangements of the embodiment(s) as well as of the particular applications of such embodiment(s). References to positional descriptions in this specification, such as 'lower' and 'upper', and associated forms such as 'uppermost' and 'lowermost', are to be taken in context of the relevant example embodiments shown in the figures and are not to be taken as limiting the scope of the principles described herein to the literal interpretation of the term, but rather as would be understood by the skilled addressee.

For the purpose of this specification, the word "comprising" means "including but not limited to", and the word "comprises" has a corresponding meaning.

The above embodiments have been described by way of example only and modifications are possible within the scope of the claims that follow.

The invention claimed is:
1. An illuminated vehicle sign, comprising:
a receptacle attachable to a vehicle, wherein the receptacle comprises an internal cavity having a light reflective internal surface;
a cover over an end of the receptacle, wherein the cover has one or more orifices opening into the internal cavity from an outside of the receptacle, wherein the orifices are dimensioned and/or relatively arranged in accordance with one or more markings or alphanumeric characters corresponding to the vehicle, and wherein the orifices provide for ingress of air into the internal cavity from the outside of the receptacle, and wherein the orifices provide for emission of light from the internal cavity to the outside of the receptacle;
a light source for emitting the light through the internal cavity and out of the orifices, wherein the light source is positioned relative to the internal cavity such that the light is reflected toward the orifices by the light reflective internal surface; and
an apertured screen disposed inside of the internal cavity, wherein the apertured screen is spaced apart from the cover and comprises a plurality of holes to allow the light to propagate from the light source through the screen toward the cover and orifices, and wherein a surface of the screen that faces the cover is light reflective such that rays of the light that are incident on the surface are reflected back toward the cover and the orifices.

2. The illuminated vehicle sign according to claim 1, wherein the light source is positioned relative to the orifices such that the light source is hidden from sight when the internal cavity is viewed through the orifices from any position on the outside of the receptacle.

3. The illuminated vehicle sign according to claim 2, wherein the light source is located inside of the internal cavity.

4. The illuminated vehicle sign according to claim 2, wherein the light source is located outside of the internal cavity and is arranged to emit the light into the internal cavity via one or more conduits connected between the light source and the receptacle.

5. The illuminated vehicle sign according to claim 1, wherein the illuminated vehicle sign also comprises a vehicle light, the vehicle light comprising:
a housing attachable to the vehicle, wherein the housing comprises an internal cavity with a light reflective internal surface, and an aperture opening into the internal cavity of the housing from an outside of the housing, wherein the aperture provides for ingress of air into the internal cavity of the housing and for emission of light from the internal cavity of the housing;
a vent formed in the housing that is positioned relative to the aperture to provide for egress of the air from the housing; and
a light source disposed within the housing to emit light through the internal cavity of the housing and out of the aperture, wherein the light source disposed within the housing is positioned relative to the aperture such that it is hidden from sight when the internal cavity of the housing is viewed through the aperture from any position outside of the housing.

6. The illuminated vehicle sign according to claim 5, wherein a vent is provided in the receptacle of the illuminated vehicle sign that is arranged to divert the air flowing into the receptacle via the orifices into the housing of the vehicle light.

7. The illuminated vehicle sign according to claim 6, wherein the vent formed in the receptacle is elongated and extends diagonally downward from the receptacle into the housing of the vehicle light.

8. The illuminated vehicle sign according to claim 5, wherein the receptacle of the illuminated vehicle sign comprises a deflection member configured to deflect the air flowing into the receptacle via the orifices into the vent formed in the receptacle.

9. The illuminated vehicle sign according to claim 5, wherein the housing is dimensioned such that the light source disposed within the housing is hidden from sight by a section of the housing when the internal cavity of the housing is viewed through the aperture from the outside of the housing.

10. The illuminated vehicle sign according to claim 9, wherein:
the housing comprises at least first and second elongate portions connected together such that respective longitudinal axes of the elongate portions are not coaxial;
the aperture is provided in the first of the elongate portions;
the light source disposed within the housing is positioned in the second of the elongate portions; and
the light source disposed within the housing is hidden from sight by the second of the elongate portions when the internal cavity of the housing is viewed through the aperture from the outside of the housing.

11. The illuminated vehicle sign according to claim 10, wherein the second of the elongate portions comprises an internal section that protrudes into an internal cavity of the first of the elongate portions, wherein the internal section comprises an endmost aperture for emitting light from the light source disposed within the housing into the internal cavity of the first of the elongate portions.

12. The illuminated vehicle sign according to claim 11, wherein the internal section is dimensioned to allow air to flow around the internal section when the air is flowing from the aperture towards the vent formed in the housing.

13. The illuminated vehicle sign according to claim 12, wherein an annular skirt extends around a circumference of the internal section, wherein the annular skirt is adapted to deflect air towards the vent formed in the housing.

14. The illuminated vehicle sign according to claim 13, wherein the annular skirt comprises a concave lowermost deflection surface.

15. The illuminated vehicle sign according to claim 11, wherein the internal section is tubular.

16. The illuminated vehicle sign according to claim 5, wherein the housing comprises a ledge outwardly extending from a lowermost edge of the aperture.

17. The illuminated vehicle sign according to claim 16, wherein the housing comprises a tubular portion having an outlet end comprising the aperture, and wherein the ledge outwardly extends from a lowermost edge of the outlet end.

18. The illuminated vehicle sign according to claim 17, wherein the outlet end is downwardly bevelled.

* * * * *